United States Patent
Heiskanen et al.

(10) Patent No.: US 12,546,064 B2
(45) Date of Patent: Feb. 10, 2026

(54) MULTIPLY CONTAINERBOARD FOR USE IN CORRUGATED BOARD

(71) Applicant: Stora Enso OYJ, Helsinki (FI)

(72) Inventors: Isto Heiskanen, Imatra (FI); Jukka Kankkunen, Imatra (FI)

(73) Assignee: Stora Enso OYJ, Helsinki (FI)

( * ) Notice: Subject to any disclaimer, the term of this patent is extended or adjusted under 35 U.S.C. 154(b) by 296 days.

(21) Appl. No.: 18/559,421

(22) PCT Filed: May 13, 2022

(86) PCT No.: PCT/IB2022/054476
§ 371 (c)(1),
(2) Date: Nov. 7, 2023

(87) PCT Pub. No.: WO2022/243818
PCT Pub. Date: Nov. 24, 2022

(65) Prior Publication Data
US 2024/0240408 A1   Jul. 18, 2024

(30) Foreign Application Priority Data

May 17, 2021  (SE) .................................. 2150622-5

(51) Int. Cl.
| | |
|---|---|
| *D21H 27/40* | (2006.01) |
| *B32B 29/00* | (2006.01) |
| *B32B 29/08* | (2006.01) |
| *D21F 11/04* | (2006.01) |
| *D21H 11/04* | (2006.01) |
| *D21H 11/06* | (2006.01) |
| *D21H 21/16* | (2006.01) |
| *D21H 21/18* | (2006.01) |
| *D21H 27/10* | (2006.01) |
| *D21H 27/38* | (2006.01) |

(52) U.S. Cl.
CPC ........... *D21H 27/40* (2013.01); *B32B 29/005* (2013.01); *B32B 29/08* (2013.01); *D21F 11/04* (2013.01); *D21H 11/04* (2013.01); *D21H 11/06* (2013.01); *D21H 21/16* (2013.01); *D21H 21/18* (2013.01); *D21H 27/10* (2013.01); *D21H 27/38* (2013.01); *B32B 2250/03* (2013.01); *B32B 2250/26* (2013.01); *B32B 2553/00* (2013.01)

(58) Field of Classification Search
CPC ........ D21H 27/40; D21H 27/38; D21H 11/10; D21F 11/04; B32B 2250/03; B32B 2250/26; B32B 2553/00; B32B 29/005; B32B 29/08; Y02W 30/80
See application file for complete search history.

(56) References Cited

U.S. PATENT DOCUMENTS

| | | | |
|---|---|---|---|
| 3,925,150 A | 12/1975 | Marsh | |
| 4,102,738 A * | 7/1978 | Dzurik | ................... D21H 17/24 162/163 |
| 2021/0047097 A1 | 2/2021 | Nordstrom | |

FOREIGN PATENT DOCUMENTS

| | | |
|---|---|---|
| EP | 3739115 A1 | 11/2020 |
| SU | 1490208 A1 | 6/1989 |
| WO | 2015036930 A1 | 3/2015 |
| WO | 2018054957 A1 | 3/2018 |
| WO | 2020003128 A1 | 1/2020 |
| WO | 2020003129 A1 | 1/2020 |
| WO | 2021059219 A1 | 4/2021 |

OTHER PUBLICATIONS

Dou Zhengyuan, "Pulping Technology", 1st Edition, China Light Industry Press, pp. 128-129 Mar. 31, 2000.
Office Action from corresponding Chinese patent application No. 202280035642.8, issued on May 21, 2025.
Extended European Search Report from corresponding European application No. 22804140.6, dated Mar. 6, 2025.
International Search Report from corresponding PCT application No. PCT/IB2022/054476, mailed Jun. 29, 2022.
Kirwan, Mark J., Paper and Paperboard Packaging Technology, Blackwell Publishing, 2005.
Ali, S.A., Design of multilayer paperboard for optimised compression strength, Diploma work, Mar. 16, 2020, DiVA, id: diva2:1414185, retrieved on Nov. 11, 2021, retrieved from the internet: https://www.diva-portal.org/smash/get/diva2:1414179/FULLTEXT02.pdf.

* cited by examiner

*Primary Examiner* — Abbas Rashid
*Assistant Examiner* — Elisa H Vera
(74) *Attorney, Agent, or Firm* — Greer, Burns & Crain, Ltd.

(57) ABSTRACT

The present invention relates to a multiply containerboard for use in corrugated board, said multiply containerboard comprising: a first outer ply, a second outer ply, and at least one intermediate ply sandwiched between the first and second outer ply, wherein said first and second outer ply comprise at least 70 wt % neutral sulfite semi chemical (NSSC) pulp based on dry weight, and wherein said intermediate ply comprises at least 30 wt % unbleached kraft pulp based on dry weight and at least one cellulose based strength enhancement agent, and wherein said intermediate ply comprises less than 30 wt % NSSC pulp based on dry weight.

15 Claims, No Drawings

MULTIPLY CONTAINERBOARD FOR USE IN CORRUGATED BOARD

This application is a U.S. National Phase under 35 U.S.C. § 371 of International Application No. PCT/IB2022/054476, filed May 13, 2022, which claims priority under 35 U.S.C. §§ 119 and 365 to Swedish Application No. 2150622-5 filed May 17, 2021.

TECHNICAL FIELD

The present invention relates to a multiply containerboard for use in corrugated board.

BACKGROUND

Corrugated board (sometimes referred to as corrugated cardboard or corrugated fiberboard) is a packaging material which can be converted to different types of packaging solutions. Corrugated board is a fiber based material made from cellulose fibers. The fibers can be virgin fibers or recycled fibers, such as fibers from used corrugated cardboard or other materials.

The corrugated board comprises at least one corrugated medium (fluting) and at least one non-corrugated medium (liner or linerboard) glued onto a surface of the corrugated medium. For example, the corrugated board may consist of a layer of fluting glued between two layers of liner to form a sandwich structure. The sandwich structure can be formed in different ways such as in single, double, and triple walls as described, e.g., in Kirwan M., J., Paper and Paperboard. Packaging Technology, Blackwell Publishing 2005.

One difficulty when producing corrugated board is the adhesion of the liner to the fluting. Too low adhesion causes delamination and addition of too much adhesive to ensure that the adhesion is sufficient can cause washboarding and curl of the corrugated board. It is important that the adsorption of the added glue into the liner and/or corrugated medium is optimal. If the adhesive is not adsorbed by the fluting/liner delamination will occur and the same will happen if it is adsorbed too much into the fluting/liner.

There are different kinds of corrugated board qualities, and these may comprise different types of liners and corrugated media. Containerboard (also known as CCM or corrugated case material) is a type of paperboard specially manufactured for the production of corrugated board. It includes both linerboard and corrugating medium (or fluting), the two types of paper that make up corrugated board. Since containerboard is made mainly out of natural unbleached wood fibers, it is generally brown, although its shade may vary depending on the type of wood, pulping process, recycling rate and impurities content.

Examples of different types of liners are kraftliner and testliner. Kraftliner is typically produced from kraft pulp that can be bleached or unbleached and may comprise one or more layers/plies wherein the top layer/ply is often optimized to provide a good printing surface and good moisture resistance. Testliner is mainly produced from recycled corrugated board and is commonly manufactured in two layers/plies. Due to the presence of recycled fibers, testliner may typically have lower mechanical strength, particularly lower burst strength, than kraftliner. Kraftliner is frequently used in packaging boxes with higher demands on strength properties.

Fluting is formed from paper or paperboard which has been corrugated using heat, moisture and pressure using a corrugator.

Fluting is often prepared from neutral sulfite semi chemical (NSSC) pulp. NSSC pulp, which is normally made from hardwood species, is noted for exceptional stiffness and high rigidity making it suitable for use in fluting. Neutral Sulfite Semi-Chemical (NSSC) pulping is an old process that it is well known in the field of paper pulping. One of the reasons for using NSSC pulping is the high yield, typically above 60%. In NSSC pulping, the cooking liquor comprises sulfite, such as $Na_2SO_3$ or $(NH_4)_2SO_3$ and a base, such as NaOH or $Na_2CO_3$. "Neutral" means that the pH of the NSSC cooking liquor is generally between 6 and 10. The pulp can be cooked in a batch or continuous cooker. Normally, the cooking time is between 5 minutes and 3 hours and the cooking temperature is 160-200° C. The NSSC pulp comprises comparatively high amounts of residual lignin, such as 15-20%, which makes the NSSC pulp stiff. The Kappa number of the NSSC pulp is typically above 70. The NSSC pulping is "semi-chemical" in the sense that it also comprises mechanical refining of the pulp. Refining may for example be done using a disc refiner at digester pressure or at atmospheric pressure.

Currently, strength and mechanical properties of fluting and corrugating medium are improved by adding small amounts of chemical pulp to mechanical pulps. Typically, 5-15% chemical pulp is added. This of course adds costs but also leads to reduced dewatering speed. One potential route is to mix semi-chemical pulp such as NSSC with unbleached kraft pulp, although this may lead to undesired optical mottle and variations in shade, as well as variations in organoleptic properties.

The fluting and liner(s) are attached to each other by arranging an adhesive between the corrugated medium and liner(s). The liner is attached to at least one surface of the corrugated medium by the adhesive. The adhesive is preferably applied on a least one surface of the fluted corrugated medium and the liner is thereafter attached to said surface. Any conventional adhesives in the area may be used. The adhesive may for example be a glue that is based on starch that can be extracted from a wide variety of plants. Some of the most common plants are maize, wheat, barley, rice, potato, tapioca and peas. The starch is preferably native, i.e. no modification of the starch has been done. The adhesive may also comprise water, sodium hydroxide and boric acid. Other additives, such as additives to improve the wet strength or adhesive bond strength may also be added. Also, other functional chemicals in order to improve e.g. moisture resistance or gelling behavior can be added, e.g. borax, glyoxal or mixtures thereof.

One important challenge when making corrugated medium and corrugated board is the resistance to humidity. When the corrugated board is exposed to humidity, water and water vapor may diffuse through the liners and soften the corrugating medium. A common solution to this problem is to increase grammage of the fluting and/or liner, but this is in conflict with environmental demands requiring lower grammage materials consuming less raw material.

Another solution is to provide a barrier layer on the liner to reduce the penetration of water and water vapor. However, this is only a partial solution since moisture diffusion may still occur on the opposite side or via the edges and consequently impact the mechanical stability of the corrugated board. Barrier layers also increase cost and typically reduce recyclability of the materials.

The fluting or corrugating medium may also be treated with hydrophobizing chemicals or coated, but this generally adds costs and may also impact the mechanical properties of the fluting negatively. High levels of hydrophobizing chemicals may also compromise the adhesion between the fluting and the liner(s). Particularly, NSSC pulps require high levels of hydrophobizing chemicals to obtain a required level of water resistance in the finished fluting.

New machine concepts and increased machine speeds, combined with increased demands for source reduction, has further increased the need for pulps with improved properties.

There remains a need for new and improved fluting and liner materials that combine strength, low grammage, water/moisture resistance, low chemical consumption, low cost, and/or high recyclability.

DESCRIPTION OF THE INVENTION

It is an object of the present disclosure to provide an improved NSSC pulp based containerboard, preferably for use in fluting for corrugated board, which solves or ameliorates at least some of the above mentioned problems.

It is a further object of the present disclosure to provide an NSSC pulp based containerboard with improved strength properties, particularly burst strength, which can be manufactured with high dewatering speed.

It is a further object of the present disclosure to provide an NSSC pulp based containerboard with improved chemical retention, which can be manufactured with high dewatering speed.

It is yet a further object of the present disclosure to provide an improved method for manufacturing an NSSC pulp based containerboard, preferably for use in fluting for corrugated board, which solves or ameliorates at least some of the above mentioned problems.

The above-mentioned objects, as well as other objects as will be realized by the skilled person in the light of the present disclosure, are achieved by the various aspects of the present disclosure.

The present invention is based on the inventive realization that strength and mechanical properties of NSSC pulp based containerboard can be improved, without reducing dewatering speed, by forming a multiply containerboard having outer plies comprised mainly of neutral sulfite semi chemical (NSSC) pulp and an intermediate ply comprising at least 30 wt % unbleached kraft pulp (UBKP) and at least one cellulose based strength enhancement agent. Without being bound to any specific scientific theory, it is contemplated that placing the UBKP and cellulose based strength enhancement agent in an intermediate ply does not impede dewatering to the same extent as when the UBKP and cellulose based strength enhancement agent are mixed with the NSSC pulp. The retention of the cellulose based strength enhancement agent in the intermediate ply is also enhanced by the presence of the unbleached kraft pulp. Furthermore, the use unbleached kraft pulp in the intermediate ply can also help to reduce cracking tendency in the fluting.

According to a first aspect illustrated herein, there is provided a multiply containerboard for use in corrugated board, said multiply containerboard comprising:
  a first outer ply,
  a second outer ply, and
  at least one intermediate ply sandwiched between the first and second outer ply,
  wherein said first and second outer ply comprise at least 70 wt % neutral sulfite semi chemical (NSSC) pulp based on dry weight, and
  wherein said intermediate ply comprises at least 30 wt % unbleached kraft pulp based on dry weight and at least one cellulose based strength enhancement agent, and
  wherein said intermediate ply comprises less than 30 wt % NSSC pulp based on dry weight.

Due to the high content of NSSC pulp, the containerboard of the present disclosure is particularly useful as corrugating medium for fluting to be used in corrugated board. Accordingly, in preferred embodiments, the containerboard is a fluting. This being said, the containerboard of the present disclosure may also be used as liner in corrugated board for applications wherein the high content of NSSC pulp is acceptable.

The containerboard of the present disclosure is a multiply containerboard comprising at least 3 plies, a first outer ply (also referred to as the top ply), an intermediate ply (also referred to as the mid ply), and a second outer ply (also referred to as the back ply). The outer surfaces of the multiply containerboard, i.e. the surfaces of the top and back ply facing away from the intermediate ply, are referred to as top side and back side respectively.

The containerboard of the present disclosure is a multiply containerboard comprising at least 3 plies. The containerboard can be manufactured in a paper or paperboard machine adapted for manufacturing of multiply containerboard. Paper or paperboard machines for making containerboard are well known in the art. Typically, the machine layout comprises a stock handling section, a wet end section, a pressing and drying section and optionally a calendaring and/or coating section. In the wet end section, the plies may be formed individually, using different headboxes and laminated in a wet state, or formed together in a multiply headbox. If formed individually, the plies are typically laminated before the press and drying section of the paper machine.

In some embodiments, the grammage of each of the first outer ply, the second outer ply and the intermediate ply is in the range of 20-100 g/m$^2$, preferably in the range of 30-80 g/m$^2$. The total grammage of the multiply containerboard is preferably in the range of 60-300 g/m$^2$.

The multiply containerboard of the present disclosure may also comprise further plies, such as a second intermediate ply, arranged as a middle ply, between said second and third plies. Such further plies may comprise any kind of fibers or pulp combinations.

In some embodiments, the multiply containerboard further comprises a strengthening or adhesive agent applied at the interface between the intermediate ply and one or both of the outer plies. Preferably, this strengthening or adhesive agent comprises cooked or gelatinzed or uncooked starch, or a mixture of cooked or gelatinzed or uncooked starch with microfibrillated cellulose (MFC). A preferred strengthening or adhesive agent is cooked native starch or cooked native starch mixed with microfibrillated cellulose. In some embodiments, the strengthening or adhesive agent further comprises a crosslinker. The crosslinker may for example be citric acid. In some embodiments, the strengthening or adhesive agent further comprises an insolubilizer. The insolubilizer may for example be an amino resin, glyoxal, or zirconium salt insolubilizer. The amount of strengthening or adhesive agent applied at the interface between the intermediate ply and one or both of the outer plies is preferably in the range of 0.1-5 g/m$^2$, more preferably in the range of 0.5-3 g/m$^2$, based on dry weight.

The multiply containerboard is preferably NSSC based. This means that the containerboard as a whole preferably comprises at least 50 wt %, of NSSC pulp based on dry weight. The outer plies comprise a higher content of NSSC pulp than the intermediate ply.

"NSSC pulp" is obtained from "NSSC pulping", which in turn is defined in the background section. The NSSC pulp can be hardwood pulp or softwood pulp, or a mixture thereof. The NSSC pulp is preferably hardwood pulp or a hardwood/softwood pulp mixture with less than 15 wt % softwood, preferably less than 10 wt % softwood, and more preferably less than 5 wt % softwood. The hardwood may for example be aspen, alder, poplar, eucalyptus, birch, acacia, or beech. The NSSC pulp is preferably prepared cooked using a cooking liquor comprising sulfite, preferably $Na_2SO_3$ or $(NH_4)_2SO_3$ and a base, preferably NaOH or $Na_2CO_3$. In some embodiments the yield from the NSSC pulping is above 60%, preferably above 65%, preferably above 70%, and more preferably above 75%. The term "neutral" means that the pH of the NSSC cooking liquor is in the range of 6-10. The cooking time preferably in the range of 5 minutes to 3 hours. The cooking temperature is preferably in the range of 160-200° C. The NSSC pulp may comprise comparatively high amounts of residual lignin, such as 15-20%. The Kappa number of the NSSC pulp is typically above 70, preferably above 80, preferably above 95, and more preferably above 100, according to ISO 3260. The NSSC pulping is "semi-chemical" in the sense that it also comprises mechanical refining of the pulp. Refining may for example be done using a disc refiner at digester pressure or at atmospheric pressure. The refining can be done in one or more steps at the same or different pulp consistencies. A first refining step may preferably be done at higher consistency such as 5-35%, and a second refining step may preferably be done at lower consistency <5%.

In some embodiments, the NSSC pulp has a water retention value (WRV) in the range of 120-300%, preferably in the range of 120-270%. The WRV value may be determined by standard ISO 23714 with the use of a 100 mesh wire.

The first and second outer ply comprise at least 70 wt % NSSC pulp based on dry weight. In some embodiments, said first and second outer ply comprise at least 80 wt %, preferably at least 90 wt %, NSSC pulp based on dry weight. The first and second outer ply may comprise 100 wt % NSSC pulp, but more commonly, the plies may also comprise other components, such that the first and second outer ply comprise 95 wt % or less, 90 wt % or less, 85 wt % or less, 80 wt % or less, or 75 wt % or less, NSSC pulp, based on dry weight.

The part of the first and second outer ply not being NSSC pulp may comprise any kind of fibers, such as hardwood and/or softwood fibers and may include, e.g., chemical pulp, mechanical pulp, thermomechanical pulp or chemi-thermomechanical pulp (CTMP). The part of the first and second outer ply not being NSSC pulp may also for example comprise recycled fibers. For example, the first and second outer ply of the present disclosure may consist essentially of NSSC pulp or a mixture of NSSC pulp and recycled fibers. "Recycled fibers" refers to fiber material that has previously been incorporated in some paper or board product. Alternatively, or as a complement, the part of the pulp not being NSSC pulp may for example comprise reject pulp. For example, the pulp of the present disclosure may consist essentially of NSSC pulp and reject pulp. "Reject pulp" refers to pulp prepared by refining the screen reject from a pulping process.

In some embodiments, the first and second outer ply are formed from the same pulp suspension, or from pulp suspensions having identical composition. In some embodiments, the composition of the first and second outer ply is identical, or almost identical. In some embodiments, the composition and grammage of the first and second outer ply are identical, or almost identical. Having identical, or almost identical first and second outer plies reduces problems with deformation of the multiply containerboard when exposed to variations in humidity and temperature.

The intermediate ply comprises at least 30 wt % unbleached kraft pulp based on dry weight. In some embodiments, said intermediate ply comprises at least 40 wt %, preferably at least 50 wt %, more preferably at least 60 wt %, unbleached kraft pulp based on dry weight. The intermediate ply may consist entirely of the unbleached kraft pulp and the cellulose based strength enhancement agent, but more commonly, the intermediate ply may also comprise other components, such that the intermediate ply comprises 95 wt % or less, 90 wt % or less, 85 wt % or less, 80 wt % or less, or 75 wt % or less, unbleached kraft pulp, based on dry weight.

Unbleached kraft pulp, or UBKP, generally refers to an unbleached sulphate pulp based on pine and/or spruce. The main raw material of the UBKP is preferably pine, but it can also contain up to 45 wt % spruce. In some embodiments, the UBKP has a Kappa number above 55, preferably above 60, and more preferably above 70, as determined according to SCAN ISO C-1. In some embodiments, said unbleached kraft pulp is refined to a Schopper Riegler number in the range of 25-55, preferably in the range of 28-38, as determined according to ISO 5267-1.

The part of the intermediate ply not being unbleached kraft pulp may comprise any kind of fibers, such as hardwood and/or softwood fibers and may include, e.g., chemical pulp, mechanical pulp, thermomechanical pulp or chemi-thermomechanical pulp (CTMP). The part of the intermediate ply not being unbleached kraft pulp may also for example comprise recycled fibers. For example, the intermediate ply of the present disclosure may consist essentially of unbleached kraft pulp or a mixture of unbleached kraft pulp and recycled fibers and the at least one cellulose based strength enhancement agent. "Recycled fibers" refers to fiber material that has previously been incorporated in some paper or board product. Alternatively, or as a complement, the part of the pulp not being unbleached kraft pulp may for example comprise reject pulp. For example, the intermediate ply of the present disclosure may consist essentially of unbleached kraft pulp and reject pulp and the at least one cellulose based strength enhancement agent. "Reject pulp" refers to pulp prepared by refining the screen reject from a pulping process.

The intermediate ply may further comprise NSSC pulp, but at a lower content than the first and second outer ply. The intermediate ply comprises less than 30 wt % NSSC pulp based on dry weight. Preferably, the intermediate ply comprises less than 20 wt % or less than 10 wt % NSSC pulp based on dry weight. It may be preferred that the intermediate ply comprise between 5-30 wt % NSSC pulp, preferably between 10-30 wt % NSSC pulp even more preferred between 10-20 wt % NSSC pulp based on dry weight. In some embodiments, the intermediate ply is free from NSSC pulp.

Due to the high content of NSSC pulp in the outer plies, the multiply containerboard overall still has a high content of NSSC pulp. In some embodiments, said multiply containerboard comprises at least 50 wt %, preferably at least 60 wt %, of NSSC pulp based on dry weight. In some embodiments, the multiply containerboard comprises 50-95 wt %, preferably at least 60-95 wt %, of NSSC pulp based on dry weight.

In some embodiments, the NSSC pulp used in the multiply containerboard is a fractionated NSSC pulp. Fractionated NSSC pulp is obtained by size fractionation of an NSSC pulp starting material into a fine fiber fraction and a coarse fiber fraction. Compared to the starting material, the fine fiber fraction has a higher amount of shorter and thinner fibers. In other words, the average particle size of NSSC pulp of the fine fiber fraction is lower than the average particle size of the NSSC pulp of the coarse fiber fraction. The fine fiber fraction may for example be obtained by separating the NSSC pulp starting material in pressure screens to achieve a fraction with shorter and thinner fibers.

The fine fiber fraction obtained by size fractionation of an NSSC pulp is especially advantageous for use in the outer plies of the multiply containerboard, since it has less effect on the optical properties of the liner as compared to an unfractionated or coarse fiber fraction of the NSSC pulp. The coarse fiber fraction may advantageously be used in the intermediate ply, where it does not affect the optical properties of the liner. In a preferred embodiment, the NSSC pulp used in the first and second outer ply is the fine fiber fraction of a fractionated NSSC. In a preferred embodiment, the NSSC pulp used in the intermediate ply is the coarse fraction of a fractionated NSSC pulp. In some embodiments, the average particle size of the NSSC pulp used in the first and second outer ply is lower than the average particle size of the NSSC pulp used in the intermediate ply.

The intermediate ply further comprises at least one cellulose based strength enhancement agent. The cellulose based strength enhancement agent preferably comprises, or consists of, fine cellulosic material such as highly refined cellulose. Refining, or beating, of cellulose pulps refers to mechanical treatment and modification of the cellulose fibers in order to provide them with desired properties. Strength in fiber and paperboard products can be increased by enhancing fiber-fiber contact, such as by surface fibrillation. One possibility to increase the strength of a coarser fiber mixture is to add fine cellulosic material, such as cellulose fines, e.g. obtained from white water during web formation, highly refined cellulose, or microfibrillated cellulose (MFC) as a strength enhancing agent.

In some embodiments, the cellulose based strength enhancement agent has a water retention (WRV) value of ≥250%, more preferably ≥300%. In addition, the WRV value is preferably ≤500%, more preferably ≤450% or ≤400% or ≤350%. In some embodiments, the cellulose based strength enhancement agent has a WRV value of 250-400%, or 250-380%, or 250-350%, or 300-350%. The WRV value may be determined by standard ISO 23714 with the use of a 200 mesh wire. In some embodiments, the cellulose based strength enhancement agent has a Schopper-Riegler (SR) number above 70, and preferably in the range of 70-98, as determined by standard ISO 5267-1.

In some embodiments, the cellulose based strength enhancement agent is selected from the group consisting of cellulose fines, highly refined cellulose having a Schopper Riegler number in the range of 70-90, microfibrillated cellulose (MFC), and mixtures thereof.

The at least one cellulose based strength enhancement agent is preferably mixed with the UBKP in the intermediate ply. The retention of the cellulose based strength enhancement agent in the intermediate ply is improved when the strength enhancement agent is mixed with the UBKP. The cellulose based strength enhancement agent and the UBKP can be mixed in the pulp suspension before forming the intermediate ply. Alternatively, the cellulose based strength enhancement agent and the UBKP can be mixed on the wire by adding the cellulose based strength enhancement agent to a wet web comprising the UBKP.

The term cellulose fines as used herein generally refers to cellulosic particles significantly smaller in size than cellulose fibers. In some embodiments, the term fines as used herein refers to fine cellulosic particles, which are able to pass through a 200 mesh screen (equivalent hole diameter 76 μm) of a conventional laboratory fractionation device (SCAN-CM 66:05). There are two major types of fiber fines, namely primary and secondary fines. Primary fines are generated during pulping and bleaching, where they are removed from the cell wall matrix by chemical and mechanical treatment. As a consequence of their origin (i.e., compound middle lamella, ray cells, parenchyma cells), primary fines exhibit a flake-like structure with only minor shares of fibrillar material. In contrast, secondary fines are generated during the refining of pulp.

The term highly refined cellulose pulp as used herein refers to a cellulose pulp which has been subjected to considerable refining, but not to the extent that all of the cellulose pulp will pass through a 200 mesh screen (equivalent hole diameter 76 μm) of a conventional laboratory fractionation device (SCAN-CM 66:05). The term highly refined cellulose pulp as used herein refers to a cellulose pulp having a Schopper-Riegler (SR) number above 70, and preferably in the range of 70-90, as determined by standard ISO 5267-1.

Microfibrillated cellulose (MFC) shall in the context of the patent application mean a cellulose particle, fiber or fibril having a width or diameter of from 20 nm to 1000 nm.

Various methods exist to make MFC, such as single or multiple pass refining, pre-hydrolysis followed by refining or high shear disintegration or liberation of fibrils. One or several pre-treatment steps is usually required in order to make MFC manufacturing both energy efficient and sustainable. The cellulose fibers of the pulp used when producing MFC may thus be native or pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxidation, for example "TEMPO"), or quaternary ammonium (cationic cellulose). After being modified or oxidized in one of the above-described methods, it is easier to disintegrate the fibers into MFC.

MFC can be produced from wood cellulose fibers, both from hardwood or softwood fibers. It can also be made from microbial sources, agricultural fibers such as wheat straw pulp, bamboo, bagasse, or other non-wood fiber sources. It can be made from pulp, including pulp from virgin fiber, e.g. mechanical, chemical and/or thermomechanical pulps. It can also be made from broke or recycled paper.

The amount of cellulose based strength enhancement agent in the intermediate ply is higher in the intermediate ply than in the outer plies. In some embodiments, the amount of the cellulose based strength enhancement agent is higher, preferably at least twice as high, in the intermediate ply than in the first and second outer ply. Having a higher amount of the strength enhancement agent in the intermediate ply and a lower amount in the outer plies provides for improved dewatering and better retention of the strength enhancement agent in the multiply containerboard. In some embodiments, the strength enhancement agent is distributed in the whole intermediate ply. In some embodiments, the strength enhancement agent is distributed more to one side of the intermediate ply, or even as a separate "subply" of the intermediate ply.

In some embodiments, the amount of cellulose based strength enhancement agent in the intermediate ply is in the range of 0.5-100 kg/tn, preferably in the range of 1-25 kg/tn, based on dry weight of the intermediate ply.

In some embodiments, said intermediate ply further comprises starch. The starch of the intermediate ply may for example comprise cooked or gelatinzed or uncooked starch, or a mixture thereof.

In some embodiments, said intermediate ply further comprises an internal sizing agent. The internal sizing agent is preferably a hydrophobizing sizing agent. In some embodiments, the internal sizing agent is selected form the group consisting of alkyl ketene dimer (AKD), alkenyl succinic anhydride (ASA), rosin sizes, and mixtures thereof.

In some embodiments, the ratio of the content of said internal sizing agent to the content of said cellulose based strength enhancement agent is in the range of from 0.1:10 to 10:0.1, more preferably in the range of from 0.1:5 to 5:0.1.

In some embodiments, the content of said internal sizing agent is higher, preferably at least twice as high, in the intermediate ply than in the first and second outer ply. Adding internal sizing agents in containerboard may cause problems with poor adhesion when the fluting is subsequently glued to a liner to form corrugated board. The inventors have found that these problems can be reduced by placing the internal sizing agent in the intermediate ply of a multiply containerboard. Having a higher amount of the internal sizing agent in the intermediate ply and a lower amount in the outer plies provides for improved dewatering and better retention of the internal sizing agent in the multiply containerboard.

In some embodiments, said intermediate ply further comprises a polymer based fixation agent, preferably a cationic polymer.

The multiply containerboard may further comprise additives such as native starch or starch derivatives, cellulose derivatives such as sodium carboxymethyl cellulose, a filler, retention and/or drainage chemicals, flocculation additives, deflocculating additives, dry strength additives, softeners, cross-linking aids, sizing chemicals, dyes and colorants, wet strength resins, fixation agents, de-foaming aids, microbe and slime control aids, or mixtures thereof.

Placing a higher amount of additives, including the cellulose based strength enhancement agent and the internal sizing agent in the intermediate ply together with the UBKP, rather than distributing the additives throughout the entire multiply containerboard, can provide better glue uptake in corrugator (due to higher starch uptake by outer plies). Placing the additives, particularly the internal sizing agent, in the intermediate ply rather than in the outer plies also allows for high amounts of additives to be used, which can lead to less mechano-sorptive creep in the finished corrugated board.

It has been found that the multiply containerboard benefits from not being over-dried. Particularly, it has been found that better fracture toughness of the multiply containerboard is obtained when it is dried to a specific moisture content. In some embodiments, the moisture content of the multiply containerboard is in the range of 3-17 wt %, preferably in the range of 4-14 wt %, and more preferably in the range of 5-15 wt %.

In some embodiments, the multiply containerboard has a fracture toughness Index GEOM (ISO/TS 17958) higher than 6 Jm/kg, preferably higher than 7 Jm/kg, and more preferably higher than 8 Jm/kg.

In some embodiments, the multiply containerboard has a SCT Index GEOM (ISO 9895) higher than 23 Nm/g, preferably higher than 24 Nm/g, and more preferably higher than 25 Nm/g.

In some embodiments, at least one of the outer plies of the multiply containerboard is optimized to provide a good printing surface and good moisture resistance. In some embodiments, at least the outer ply intended as the outer surface of a corrugated board is optimized to provide a good printing surface and good moisture resistance. In some embodiments, the optimization to provide a good printing surface and good moisture resistance includes surface sizing. In some embodiments the multiply containerboard is surface sized. In some embodiments the multiply containerboard is surface sized with starch. In some embodiments the multiply containerboard is surface sized with a combination of starch and at least one other functional component, preferably selected from the group consisting of a cross-linker, a reinforcing agent, and a hydrophobizing sizing agent. The crosslinker may for example be citric acid. The reinforcing agent may for example be microfibrillated cellulose (MFC). The hydrophobizing sizing agent may for example be alkyl ketene dimer (AKD), alkenyl succinic anhydride (ASA), SMA (Styrene Maleic Anhydride), a rosin size, or mixtures thereof.

Corrugated board comprises at least one layer of liner, which is non-corrugated, and at least one layer of fluting. In normal production of corrugated board, fluting is corrugated and then glued to linerboard. For example, corrugated board may consist of a layer of fluting sandwiched between two layers of liner.

According to a second aspect illustrated herein, there is provided a corrugated board comprising a multiply containerboard as defined with reference to the first aspect as fluting and/or liner.

The containerboard is preferably used as the fluting in the corrugated board. Due to the high content of NSSC pulp, the containerboard of the present disclosure is particularly useful as corrugating medium for fluting to be used in corrugated board. Accordingly, in preferred embodiments, the containerboard is a fluting. Any type of linerboard can be used.

This being said, the containerboard of the present disclosure may also be used as liner in corrugated board for applications wherein the high content of NSSC pulp is acceptable.

According to a third aspect illustrated herein, there is provided a method for manufacturing a multiply containerboard for use in corrugated board, comprising the steps of:
  a) forming a first web layer from a first pulp suspension and dewatering said first web layer to obtain a first outer ply;
  b) forming a second web layer from a second pulp suspension and dewatering said second web layer to obtain an intermediate ply on the first outer ply;
  c) forming a third web layer from a third pulp suspension and dewatering said third web layer to obtain a second outer ply on the intermediate ply;
  wherein said first and third pulp suspension comprise at least 70 wt % neutral sulfite semi chemical (NSSC) pulp based on dry weight, and
  wherein said second pulp suspension comprises at least 30 wt % unbleached kraft pulp based on dry weight and at least one cellulose based strength enhancement agent, and wherein said second pulp suspension comprises less than 30 wt % NSSC pulp based on dry weight.

The terms first, second and third web layer do not necessarily denote the order in which the web layers are formed. The web layers can be formed simultaneously or individually, in any order.

In some embodiments, the first, second and third web layer are formed and partially dewatered individually, using different headboxes and one or more wires, and subsequently laminated in a wet state.

In some embodiments, the first, second and third web layer are formed and partially dewatered together using a multiply headbox and a single wire. For example, the third web layer may be formed and partially dewatered individually, and subsequently laminated in a wet state with the intermediate ply to obtain a second outer ply on the intermediate ply. Alternatively, the third web layer may be formed and dewatered together with the second web layer.

In some embodiments, said first and third pulp suspension comprise at least 80 wt %, preferably at least 90 wt %, NSSC pulp based on dry weight.

In some embodiments, the composition of the first and third pulp suspension is identical. In some embodiments, the composition and grammage of the first and third outer ply is identical, or almost identical.

In some embodiments, said multiply containerboard comprises at least 50 wt %, preferably at least 60 wt %, of NSSC pulp based on dry weight.

In some embodiments, said second pulp suspension comprises at least 40 wt %, preferably at least 50 wt %, more preferably at least 60 wt %, unbleached kraft pulp based on dry weight.

In some embodiments, said unbleached kraft pulp is refined to a Schopper Riegler number in the range of 25-55, preferably in the range of 28-38, as determined according to ISO 5267-1.

In some embodiments, said cellulose based strength enhancement agent is selected from the group consisting of cellulose fines, highly refined cellulose having a Schopper Riegler number in the range of 70-90, microfibrillated cellulose (MFC), and mixtures thereof.

In some embodiments, the amount of cellulose based strength enhancement agent in the second pulp suspension is in the range of 0.5-100 kg/tn, preferably in the range of 1-25 kg/tn, based on dry weight of the second pulp suspension.

In some embodiments, said second pulp suspension further comprises an internal sizing agent, preferably selected form the group consisting of alkyl ketene dimer (AKD), alkenyl succinic anhydride (ASA), rosin sizes, and mixtures thereof.

In some embodiments, the content of said internal sizing agent is higher, preferably at least twice as high, in the second pulp suspension ply than in the first and third pulp suspension.

In some embodiments, said second pulp suspension further comprises a polymer based fixation agent, preferably a cationic polymer.

The method comprises forming and dewatering a number of webs from pulp suspensions. Methods for forming and dewatering webs having multiple layers are well known in the art. The containerboard can be manufactured in a paper or paperboard machine adapted for manufacturing of multiply containerboard. Paper or paperboard machines for making multiply containerboard are well known in the art. Typically, the machine layout comprises a stock handling section, a wet end section, a pressing and drying section and a calendering and/or coating section.

The webs are generally formed and dewatered in a formed in a wet end section, comprising one or more wires as conventional in the field. The plies may be formed individually, using different headboxes and laminated in a wet state, or formed together in a multiply headbox. The web is typically formed in a gap former, but it may also be formed in a fourdrinier type former. If formed individually, the wet plies are typically laminated, or couched together, before the press and drying section of the paper machine. Before the lamination, a strengthening or adhesive agent can be applied between the intermediate ply and one or both of the outer plies. Preferably, this strengthening or adhesive agent comprises cooked or gelatinzed or uncooked starch, or a mixture of cooked or gelatinzed or uncooked starch with microfibrillated cellulose (MFC). A preferred strengthening or adhesive agent is cooked native starch or cooked native starch mixed with microfibrillated cellulose. In some embodiments, the strengthening or adhesive agent further comprises a crosslinker. The crosslinker may for example be citric acid. In some embodiments, the strengthening or adhesive agent further comprises an insolubilizer. The insolubilizer may for example be an amino resin, glyoxal, or zirconium salt insolubilizer. The strengthening or adhesive agent is preferably added as a paste or an aqueous dispersion using a non-contact deposition technique, such as spray or foam or curtain application. Preferably, the solid content of the aqueous dispersion is in the range of 0.5-50 wt %, and more preferably in the range of 1-30 wt %. The amount of strengthening or adhesive agent applied is preferably in the range of 0.1-5 $g/m^2$, more preferably in the range of 0.5-3 $g/m^2$.

The web is typically subjected to further dewatering, which may for example include passing the formed multilayer web through a press section of the paper machine, where the web passes between large rolls loaded under high pressure to squeeze out as much water as possible. The press section may constitute of traditional nip press units and press fabric felts and/or with one or several shoe presses or extended dewatering nips. These can be run at various nip or press loads including different positions, temperatures and delays times. The press section may be provided with one or more shoe presses to maximize production. If using one or several shoe presses, these can be run at press levels above 800 kN/m, such as above 1000 kN/m, such as above 1200 kN/m, or such as such as above 1450 kN/m. The removed water is typically received by a fabric or felt.

After the press section, the multilayer web may be subjected to drying in a drying section. The drying may for example include drying the multilayer web by passing the multilayer web around a series of heated drying cylinders. Drying may typically remove the water content down to a level of about 1-15 wt %, preferably to about 2-10 wt %. It has been found that the multiply containerboard benefits from not being over-dried. Particularly, it has been found that better fracture toughness of the multiply containerboard is obtained when it is dried to a specific moisture content. In some embodiments, the moisture content of the multiply containerboard is in the range of 3-17 wt %, preferably in the range of 4-14 wt %, and more preferably in the range of 5-15 wt %.

The web may further be conditioned with heat and steam and fed between large corrugating rolls to give the finished fluting its corrugated shape.

Unless otherwise stated, the physical properties discussed in the present disclosure are determined according to the following standards:

| | |
|---|---|
| Brightness C/2° + UV | ISO 2470-1 |
| L* C/2° + UV | ISO 5631-1 |
| a* C/2° + UV | ISO 5631-1 |
| b* C/2° + UV | ISO 5631-1 |
| Grammage | ISO 536 |
| Thickness, single sheet | ISO 534 |
| Bulk, single sheet | ISO 534 |
| Air permeability G-H | ISO 5636-5 |
| Cobb 30 s | ISO 535 |
| Moisture content 50% rh | ISO 287 |
| Scott-Bond | TAPPI T569 |
| Tensile strength | ISO 1924-3 |
| Tensile index | ISO 1924-3 |
| Tensile strength md/cd | ISO 1924-3 |
| Stretch | ISO 1924-3 |
| Tensile stiffness | ISO 1924-3 |
| Tensile stiffness index | ISO 1924-3 |
| E-modulus | ISO 1924-3 |
| TEA | ISO 1924-3 |
| TEA index | ISO 1924-3 |
| TEA index | ISO 1924-3 |
| Fracture toughness | ISO/TS 17958 |
| Fracture toughness index | ISO/TS 17958 |
| Tearing resistance | ISO 1974 |
| Tear index | ISO 1974 |
| SCT | ISO 9895 |
| SCT index | ISO 9895 |
| RCT | ISO 12192 |
| RCT index | ISO 12192 |
| Burst index | ISO 2759 |
| Bursting strength | ISO 2759 |

Unless otherwise stated, then the standard method can be applied for determining physical and mechanical properties in both cross direction (cd) and machine direction (md)

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A corrugated board comprising:
a multiply containerboard as a fluting, a liner, or both, wherein the multiply containerboard comprises:
a first outer ply,
a second outer ply, and
at least one intermediate ply sandwiched between the first outer ply and the second outer ply, wherein said first outer ply and the second outer ply each comprise at least 70 wt % neutral sulfite semi chemical (NSSC) pulp based on a dry weight of the first outer ply or the second outer ply, respectively, and
wherein said at least one intermediate ply comprises at least 30 wt % unbleached kraft pulp, based on a dry weight of the at least one intermediate ply, and at least one cellulose based strength enhancement agent, and
wherein said at least one intermediate ply comprises less than 30 wt % NSSC pulp based on the dry weight of the at least one intermediate ply.

2. The corrugated board according to claim 1, wherein said first outer ply and the second outer ply each comprise at least 80 wt % NSSC pulp based on the dry weight of the first outer ply or the second outer ply, respectively.

3. The corrugated board according to claim 1, wherein the first outer ply and the second outer ply are formed from pulp suspensions having identical compositions.

4. The corrugated board according to claim 1, wherein said at least one intermediate ply comprises at least 40 wt % unbleached kraft pulp based on the dry weight of the at least one intermediate ply.

5. The corrugated board according to claim 1, wherein said multiply containerboard comprises at least 50 wt % of NSSC pulp based on a dry weight of the multiply containerboard.

6. The corrugated board according to claim 1, wherein said unbleached kraft pulp is: refined to a Schopper Riegler number in a range of 25-55, as determined according to ISO 5267-1.

7. The corrugated board according to claim 1, wherein said at least one cellulose based strength enhancement agent is selected from a group consisting of: cellulose fines, highly refined cellulose having a Schopper Riegler number in a range of 70-90, microfibrillated cellulose (MFC), and mixtures thereof.

8. The corrugated board according to claim 1, wherein an amount of the at least one cellulose based strength enhancement agent in the at least one intermediate ply is in a range of 0.5-100 kg/tn, based on the dry weight of the at least one intermediate ply.

9. The corrugated board according to claim 1, wherein said at least one intermediate ply further comprises an internal sizing agent.

10. The corrugated board according to claim 9, wherein the internal sizing agent is selected from a group consisting of: alkyl ketene dimer (AKD), alkenyl succinic anhydride (ASA), rosin sizes, and mixtures thereof.

11. The corrugated board according to claim 9, wherein a content of said internal sizing agent is higher, in the at least one intermediate ply than in the first outer ply and the second outer ply.

12. The corrugated board according to claim 1, wherein said at least one intermediate ply further comprises a polymer based fixation agent.

13. A corrugated board comprising:
the multiply containerboard according to claim 1 as a fluting, a liner, or both.

14. The corrugated board according to claim 1, wherein the multiply containerboard is the fluting.

15. A method for manufacturing a corrugated board having a multiply containerboard, the method comprising the steps of:
a) forming a first web layer from a first pulp suspension and dewatering said first web layer to obtain a first outer ply;
b) forming a second web layer from a second pulp suspension and dewatering said second web layer to obtain an intermediate ply on the first outer ply;
c) forming a third web layer from a third pulp suspension and dewatering said third web layer to obtain a second outer ply on the intermediate ply and thereby form a multiply containerboard,
wherein said first pulp suspension and the third pulp suspension each comprise at least 70 wt % neutral sulfite semi chemical (NSSC) pulp based on a dry weight of the first pulp suspension or the third pulp suspension, respectively, and
wherein said second pulp suspension comprises at least 30 wt % unbleached kraft pulp, based on a dry weight of the second pulp suspension, and at least one cellulose based strength enhancement agent, and wherein said second pulp suspension comprises less than 30 wt % NSSC pulp based on the dry weight based on a dry weight of the second pulp suspension; and, d) providing the multiply containerboard as a fluting, a liner, or both for a corrugated board.

\* \* \* \* \*